Dec. 24, 1968    R. WINKLER ETAL    3,417,694
METHOD AND DEVICE FOR THE APPLICATION OF LATEX
Filed Oct. 6, 1966
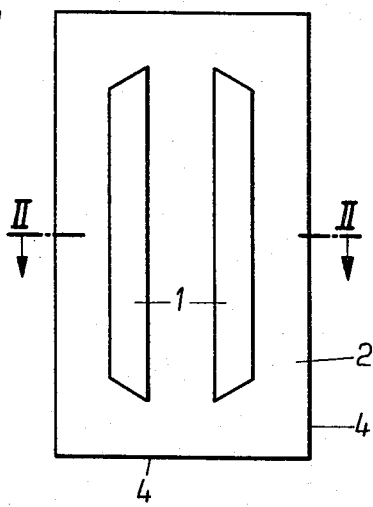
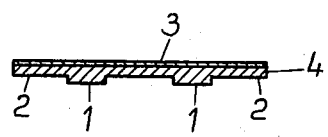
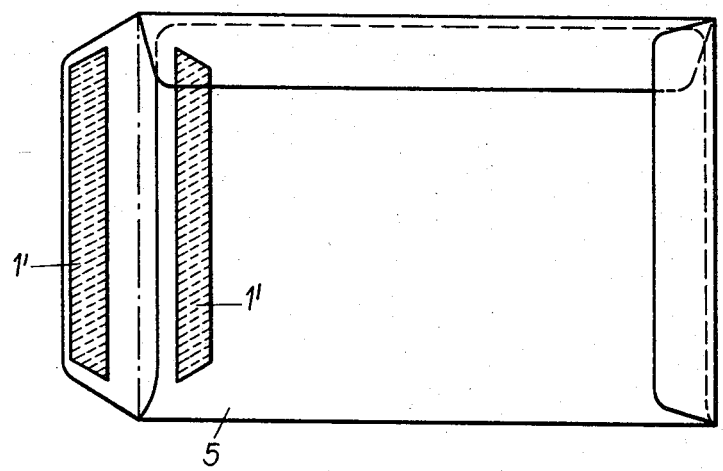
Inventors:
R. Winkler and K. Dünnebier United States Patent Office 3,417,694
Patented Dec. 24, 1968

3,417,694
METHOD AND DEVICE FOR THE APPLICATION OF LATEX
Richard Winkler, Rengsdorf, and Kurt Dünnebier, Gladbach, Germany
Filed Oct. 6, 1966, Ser. No. 584,764
Claims priority, application Germany, Nov. 9, 1965, W 40,264
1 Claim. (Cl. 101—401.1)

ABSTRACT OF THE DISCLOSURE

A profiled gum applicator capable of being placed upon the cylinder of a gumming machine to apply sections of latex to envelopes, bags and other articles, consists of a plate of soft polyvinyl chloride having raised portions upon one side and a wax cloth covering on the other side. The gum applicator is made from a strip of metal of the same shape which is used to emboss a matrix, whereupon a layer of soft polyvinyl chloride is placed upon the matrix and coated with a wax cloth, while a sheet of silicone paper is placed under the matrix and over the cloth. Then the applicator is made by embossing this layer.

---

This invention relates to a method of applying latex to envelopes, flat bags, cards and similar articles and to a device used for that purpose. The invention is particularly concerned with a mechanized application of two suitably located strips of latex upon an article for so-called "self-sealing," by means of one or two profiled gum applicators disposed upon a rotating body. Specifically the invention is concerned with profiled gum applicators mounted on rotating bodies usually constructed as cylinders, the applicators having active surfaces applying to the articles latex which they received from an advanced roller in the form of a layer of predetermined thickness.

Profiled gum applicators used for the mechanical application of dextrin or similar adhesives are usually made of natural rubber. They are produced either from rubber which has been vulcanized upon a metal shell, this being a good but expensive procedure, or a profiled section is cut from plates or strips of rubber and is directly glued upon the outer surface of a gumming cylinder. This procedure is much cheaper but it can be carried out only if the rubber is sufficiently soft, since harder rubber has the tendency to return to its initial flat shape and frequently detaches itself at its edges from the surface of the cylinders.

Natural rubber suitable for the application of dextrin can not be used for the application of latex since latex when applied upon natural rubber dries easily, for example, during a temporary stoppage of the machine, and then it cannot be removed from the outer surface of the profiled gum applicator, or it can be removed only with great difficulty. Consequently such gum applicators become useless very quickly and the film of latex which has been applied to them is very irregular. The use of synthetic rubber, such as the one known under the trademark "Perbunan," is not possible since this material is not available in the desired low degree of hardness.

An object of the present invention is the provision of a profiled gum applicator capable of applying latex, which can be affixed by adhesives directly to the gumming cylinder and which will not have the above-described drawbacks.

Another object is the provision of a method for a quick and inexpensive manufacture of a profiled gum applicator of this type.

Other objects will become apparent in the course of the following specification.

In the accomplishment of the objectives of the present invention it was found desirable to use an elastic and thermoplastic plastic material having the hardness of about 20–25 Shore to which drying latex does not adhere, such as soft polyvinyl chloride of the type sold by Dynamit Nobel AG Troisdorf under the trademark Formgussmasse 997. This substance is used as the material for the profiled gum applicator which is embossed in a correspondingly profiled matrix.

Tests with this material have shown that a latex film dried thereon can be easily removed. However, difficulties were encountered due to the fact that a profiled gum applicator made from this material could not be attached by any of the conventional adhesives to the gumming cylinder since no conventional adhesive adheres to this material. Initial attempts to cast the profiled gum applicators in molds were not successful due to the shrinkage of the cast material; other difficulties arose due to the formation of bubbles and distortion when fixing it to the gumming cylinder. All these difficulties have been eliminated by the present invention as will be described in detail hereinafter.

The invention will appear more clearly from the following detailed description when taken in connection with the accompanying drawing, showing by way of example, a preferred embodiment of the inventive idea.

In the drawing:

FIGURE 1 is a plan view of a profiled gum applicator.

FIGURE 2 is a section along the line II—II of FIG. 1.

FGURE 3 shows a flat bag provided with latex strips by means of the applicator of the present invention.

The profiled gum applicator is produced from a soft polyvinyl chloride material in accordance with the following process:

(a) Strips or sections of sheet metal or the like having a thickness of approximately two millimeters are shaped in conformity with the desired shape of the gum applicator so as to be provided with the applying sections 1 (FIG. 1).

(b) A matrix consisting, for example, of the pattern mat described in U.S. Patent No. 3,031,959, is formed in a vulcanizing press in a conventional manner from the above-described sheet metal strips.

(c) Soft polyvinyl chloride material is melted and a plate of about 5 millimeter thickness is cast therefrom (provided the material is not available in the shape of a plate).

(d) The plate of the required size is placed on the matrix and a corresponding piece of wax cloth or the like is coated upon one side of the plate with the rough cloth side facing the plate, while a sheet of silicone paper is placed under the matrix and over the cloth coated on one side, so as to prevent the soft polyvinyl chloride material from sticking to the vulcanizing press. Wax cloth is a cotton cloth one side of which is coated, for example, with polyacrylester. The opposite, uncoated side has the roughness of the cloth. This rough uncoated side will stick to the plate of soft polyvinyl chloride under heat and pressure. Silicone paper is a sheet of paper impregnated with silicone. As already stated, silicone will prevent the resin from sticking to the metal parts of the press.

(e) Then the soft polyvinyl chloride material is embossed in a vulcanizing press at a temperature which is sufficiently below the melting point of the material.

(f) Then the matrix together with the profiled gum applicator made from the soft polyvinyl chloride material are removed from the vulcanizing press and are allowed to cool. Finally the gum applicator is pulled off the matrix and is preferably rubbed with talcum powder.

The profiled gum applicator produced in this manner has raised gum-applying portions 1 for applying latex strips 1' upon a flat bag 5 which extends approximately 2 millimeters beyond the surface 2 of the applicator. A piece of wax cloth 3 or the like is firmly attached with its cloth side to the applicator. The wax cloth is trimmed at the edge 4. Then the wax cloth with the applicator connected therewith is affixed by the usual adhesive band having glue on both sides in the required position upon a gumming cylinder (not shown) of a machine applying adhesives to various articles. In addition to its stability against latex, the gum applicator of the present invention, due to its low hardness of 20–25 Shore, has the advantage that the thickness of the layer of latex applied over the articles is substantially uniform even if the articles, such as flat folded bags, have locations with two layers of paper and other locations with three layers of paper.

It is apparent that the example described above has been given solely by way of illustration and not by way of limitation and that it is capable of many variations and modifications within the scope of the present invention. All such variations and modifications are to be included within the scope of the present invention.

What is claimed is:

1. A method of producing a soft profiled gum applicator adapted to be attached to a machine cylinder for applying sections of latex to envelopes, bags and other articles, said method comprising the steps of:

(a) making a strip of sheet metal having the shape of the gum applicator, (b) embossing a matrix by vulcanization from said strip, (c) melting soft polyvinyl chloride and casting it to form a soft thin plate, (d) preparing a cloth having a smooth coated side and an opposite uncoated rough side, (e) placing said plaate of polyvinyl chloride upon the matrix and coating one side of the plate with said wax cloth, the rough side of the cloth facing the plate, (f) placing a sheet of silicone paper under the matrix and over the cloth, (g) heating and embossing said plate by said matrix to form the applicator, and (h) cooling the applicator and removing it from said matrix.

References Cited

UNITED STATES PATENTS

| | | | |
|---|---|---|---|
| 2,875,051 | 2/1959 | DeMoria. | |
| 3,031,959 | 1/1962 | Libberton | 101—395 |
| 3,113,514 | 12/1963 | Hogan | 101—379 |
| 3,217,642 | 11/1965 | Tompkins et al. | 101—395 X |
| 3,221,654 | 12/1965 | Jernt | 101—395 X |
| 3,232,231 | 2/1966 | De Moria et al. | 101—395 |

DAVID KLEIN, *Primary Examiner.*

U.S. Cl. X.R.

101—375, 376, 395; 118—256, 258